United States Patent [19]

Niemi

[11] 4,358,821

[45] Nov. 9, 1982

[54] METHOD AND APPARATUS FOR THE INCORPORATION OF VARYING FLOW IN THE CONTROL OF PROCESS QUANTITIES

[76] Inventor: Antti Niemi, Yrjö Liipolantie 5, Kauniainen, Finland

[21] Appl. No.: 155,751

[22] Filed: Jun. 2, 1980

[30] Foreign Application Priority Data

May 31, 1979 [FI] Finland .................................. 791745

[51] Int. Cl.$^3$ ........................................... G05B 11/42
[52] U.S. Cl. ................................... 364/152; 364/105; 364/510; 364/148; 318/561; 318/610
[58] Field of Search ............... 364/105, 106, 118, 510; 318/561, 610

[56] References Cited

U.S. PATENT DOCUMENTS

| | | | |
|---|---|---|---|
| 3,373,268 | 3/1968 | Hewlett, Jr. ......................... | 364/118 |
| 3,552,428 | 1/1971 | Pemberton .......................... | 364/510 |
| 3,614,633 | 10/1971 | Yalyshev et al. ................... | 364/118 |
| 3,945,253 | 3/1976 | Liu et al. ............................. | 364/510 |
| 4,037,598 | 7/1977 | Georgi ................................. | 364/510 |
| 4,111,218 | 9/1978 | Hobbs ................................. | 364/118 |
| 4,214,300 | 7/1980 | Barlow et al. ....................... | 364/105 |
| 4,236,202 | 11/1980 | Giles et al. .......................... | 364/118 |
| 4,250,543 | 2/1981 | Smith et al. ......................... | 364/118 |

Primary Examiner—Charles E. Atkinson
Attorney, Agent, or Firm—Holman & Stern

[57] ABSTRACT

There is disclosed a method and an apparatus for the incorporation of varying flow in the control of process quantities. According to the invention the passing flow is measured and the amount of material flowed through the process is determined by integration of the result of said measurement. Furthermore, values of a variable are determined in direct ratio to the amount of material and the control of the process is performed synchronously with regard to that variable.

5 Claims, 1 Drawing Figure

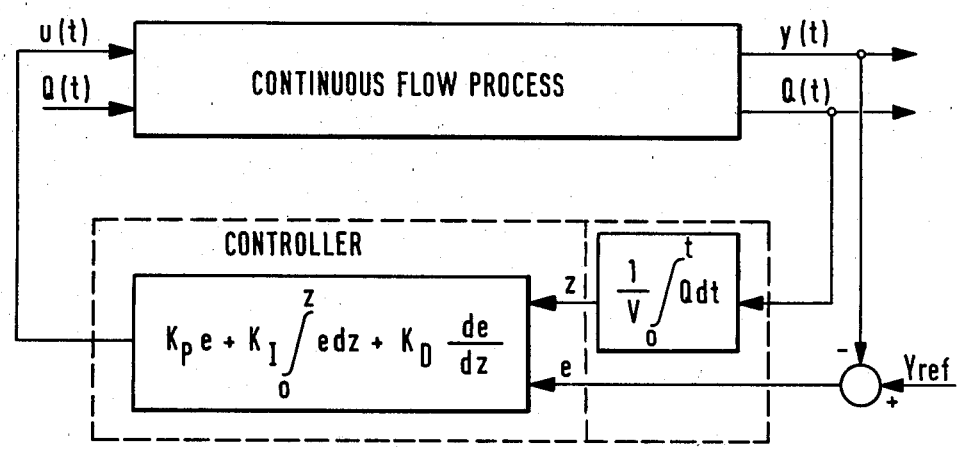

METHOD AND APPARATUS FOR THE INCORPORATION OF VARYING FLOW IN THE CONTROL OF PROCESS QUANTITIES

BACKGROUND OF THE INVENTION

1. Field of the Invention

The present invention deals with a control method which incorporates the changes of the flow through the process to be controlled with determination of the control signal to the control valve or other actuator. The invention deals also with an apparatus for implementation of the method.

2. Description of the Prior Art

Control of various process quantities is implemented in industry by means of unit controllers which are commercially obtainable. When the control is implemented with devices of other type like e.g. with a computer in which the control tasks are concentrated, the control calculations generally follow known standard principles. It is characteristic of these control methods, e.g. that each process quantity under control is controlled separately and the effect of other varying quantities on the properties of the control loop and on the operation of the control is neglected. Changes of the flow through the production process disturb considerably the control of other process quantities. The flow through a normal production process is submitted to temporal changes both for random reasons, e.g. in the presence of disturbances in the same process or in a process connected serially to it, and intentionally, when the production is increased or decreased. The changes of flow may also belong to the normal operation, e.g. when the process includes devices which operate periodically like the batch digesters for cellulose pulp or when pipelines slowly get clogged under longterm use.

Because of the same changes of flow the controllers connected to the production process have to be tuned for the worst occurring case or, in practice, for the smallest occurring value of the flow. The time parameters of the process which depend on the flow are inversely related to the magnitude of the flow and, correspondingly, the bandwidth of the process, or the frequency range in which the process represents a considerable gain with regard to the input signals, is directly related to the flow. If now the controller would be tuned so that it gives an optimal result for the nominal value of the flow, and if the flow would then decrease, a narrower bandwidth of the process would result, assuming unchanged properties of the controller, whereby the control would deteriorate and the control could even fall into an oscillatory state, if the flow would become small enough. The presence of such inconvenient oscillations is known in practice i.e. in control of the temperature of a liquid by means of a tubular heat exchanger. The proportion of the time delay factor is high in such process, and this implies a negative phase shift which depends strongly on the frequency and, therefore, a tendency to oscillations.

In some cases one has tried to consider the variable flow through a compensating factor which depends on it. For example, in control of the final temperature of steam in a boiler by means of water sprayed into the steam in the middle of the superheater, the flow of the cooling water is sometimes controlled to be directly proportional to the flow of the steam. The final controlled quantity, the final temperature of the superheated steam is measured separately and the setpoint of the controller controlling said cooling water is adjusted on the basis of the measured value. Since now the speed with which the final temperature of the steam reacts to the flow of the cooling water depends strongly on the steam flow, it is seen that the described control method neglects this dependence, and the temperature controller, acting as the main controller, must be tuned for the smallest occurring steam flow.

Because of the varying flow, the continuous flow process is time variable, i.e. its parameters change with time. It has been shown theoretically that the residence time distribution of the mass flow process can be brought to an invariant form of presentation, if the continuous flow Q, which is the essential factor causing the time dependence, is taken into consideration by shifting to a new variable z (A. Niemi, Int. J. of Applied Radiation and Isotopes (1977) pp. 855–860).

$$z(t, \eta) = z(t) = \frac{1}{V} \int_\eta^t Q(v)dv \qquad (1)$$

V volume
t,v time variables
$\eta$ fixed origin of time

The residence of a material in a continuous flow device can be described by means of a function of one quantity, the difference $z(t,\eta)-z(\theta,\eta)=z(t)-z(\theta)$, even if the flow varies. If the functional form of the residence distribution of the process is known, and if the input quantity of the process is observed by means of measurements, the output quantity of the process can be calculated by means of this function, even if the flow varies.

SUMMARY OF THE INVENTION

The present invention provides a method for the incorporation of varying process in the control of flow quantities, which comprises measuring the passing flow, integrating the result of the measurement so as to determine the amount of material flowed through the process, determining values of a variable in direct ratio to said amount of material, and performing the control of the process synchronously with regard to said variable.

The invention is applicable in the control of processes with both known and unknown flow characteristics and takes the changes of the flow through the process into consideration. The device may typically be a proportional-plus-integral-plus-derivative controller whereby it, as compared with a conventional PID controller, implies an improvement in that it operates equally well at a variable flow as at a constant flow, while the operation of a loop provided with a conventional PID controller deteriorates, if the flow deviates from the constant value which corresponds to the conditions for which the controller was tuned.

A basis of the invention is the finding that, although the controller does not normally contain a mathematical model of the process, it nevertheless handles mathematically the control deviation, i.e. the difference of the output quantity of the process from the reference value, and that these mathematical operations can be brought into a dependence on the flow through the process. A controller of this kind can be connected to the process to be controlled in the same manner as the conventional, commercially obtainable controllers and provided additionally with measured information of the flow through the process. Like the commercial controllers, a controller of this kind can be tuned by experimentation, even if the mathematical process model would be unknown, whereby, using it, for constant flow equally good results and for variable flow better results are reached, than using a conventional controller. In order to describe the structure of the new controller and to present the tuning methods which lead to the best results, it will be shown in the following that the above described variable, which is proportional to the time integral of the flow through the process, can be used as a basis of the ways of presentation and methods of tuning which are parallel to previously known methods of control technology.

The control object is described in engineering practice and also in textbooks of control engineering expediently by a dynamic model formed of differential equations. Such dynamic process model can be composed e.g. for an ideal mixer in order to describe the concentration C of some component of the process material in dependence of the concentration $C_0$ of the incoming flow.

$$V(dC/dt) = QC_0 - QC \qquad (2)$$

If, besides the concentrations, also the flow changes as a function of the time, $Q = Q(t)$, one obtains by introducing the variable presented in the introduction (1):

$$V(dC/dz)\cdot(dz/dt) = Q(t)C_0 - Q(t)C \qquad (3)$$

$$dC/dz = C_0 - C \qquad (4)$$

Despite the variable flow, the model of the concentration process has thus been brought to a constant coefficient form of presentation. A corresponding, although more complicated, form of presentation is obtained for the system of several mixers, which for its description, requires an equal number of first order differential equations, or for a process which can be approximately presented by a model consisting of several mixers. The model consisting of several first order differential equations can be brought, further on, to the form of one differential equation of a higher order. If the Laplace transformation is applied to this equation, the transfer function of the process is obtained. From this one may, further on, go to the frequency response characteristic over the process, by a change of a variable. All methods, quantities and functions needed here are well known and much used in control engineering. They are described in detail in the literature dealing with the basics of control engineering.

In the referenced article it is presented that the residence characteristics of continuous flow vessels and also systems of other types, like those including plug flow or recycling of material, or those having a general, arbitrary mixing characteristic, can be presented using the variable z. If the functional form of the model is known analytically, like in the two cases mentioned first, one obtains by the Laplace transformation from the respective invariant weighting function the transfer function of the process and from this, further on, the frequency response characteristic. If, on the other hand, the distribution is known, e.g. on the basis of experimental results, in the form of a sequence of numbers which has been presented in an invariant form as a function of z, one may go from this to the frequency response characteristic by means of the numerical Fourier transformation; the use of the latter for transformation of an invariant function of the time is known from prior art (J. Hougen and R. Walsh, Chem. Engng Progress 57, No. 3, 1961, pp. 69–79).

The methods of tuning the controller which are based on the transfer function, on its characteristic function and on graphical ways of presenting the frequency response characteristic, which are described in textbooks of control engineering, and which aim to the control of processes with constant parameters, can now be applied. By means of them, the controller can thus also be tuned for a process submitted to variable flow, assuming that this has first been brought to an invariant form of presentation. If one wants to use e.g. a PID controller, suitable values are chosen for the three controller parameters $K_p$, $K_I$ and $K_D$ by known graphical methods in the frequency domain. Using the transfer function presentation, the following input/output dependence and transfer function G(s) are valid for such controller:

$$U(s) = G(s)E(s) \qquad (5)$$

$$G(s) = K_P + (K_i/s) + K_D s \qquad (6)$$

E(s) Laplace transformation of control deviation
U(s) Laplace transformation of output quantity of controller The selection of the values of the parameters in question proceed in tuning the new method entirely the same way as in the control parameters of a time invariant process, since when operating in the frequency domain, the methods of handling are independent of the type of original presentation from which one has entered the frequency domain.

No controller connected to a real production process which executes control continuously or repeatedly does perform these control calculations in a transform domain, but in the time domain where the transfer function or frequency response characteristic of the controller are corresponded by their inverse transforms. In a manner which corresponds to the conventional inverse transformation to the time domain, one returns now by an inverse transformation from the variables of the frequency domain to the original variable z. The controller will then perform its mathematical operations in terms of this variable.

$$u(z) = K_P e(z) + K_I \int_o^z e(z)dz + K_D \frac{de(z)}{dz} \qquad (7)$$

Since the flow Q and, further on, the variable z are known by continuous or repeated measurements and integration, the output quantity u of the PID controller can be determined in a straightforward way. This quantity is directed to the actuator as the control signal in the same way as in using a control with constant parameters in the known manner. It is seen from the equation (1) that if the flow Q does not change but keeps continuously to its nominal value, the controller in fact performs the integration and derivation with regard to the normal time variable and thus operates as the controller of other process quantities in the fully same manner as the conventional PID controller. If one considers that in addition to the volume V also the flow Q is now constant, one sees that the coefficients K of the equation (7) can be calculated in a simple way from the corresponding coefficients of the conventional control, if these are known previously, and no other method of tuning is needed.

If the model of the process is not known or if it is known only inaccurately, the standard controllers including the PID controller are tuned in practice by experimentation. A similar experimenting method of tuning can also be applied to the selection of the parameter values of the controller presented here. The scheme of a control loop provided with the presented controller is shown in the FIGURE.

DESCRIPTION OF THE PREFERRED EMBODIMENTS

The FIGURE presents a feedback control loop of a continuous flow process in which the quantity z is formed which is directly proportional to the time integral of the flow. The controller forms the proportional control component by multiplying the control deviation with a constant, the integral control component by integrating the control deviation with regard to z, and the derivative control component by differentiating the control deviation with regard to z, and determines the control signal of the process as the sum of these components. The flow Q may alternatively be measured at the input side of the process. Y and $Y_{ref}$ refer to the output quantity of the process and to its desired value.

Following logically from the same principle, one may construct controllers of other types which perform the control with z as the argument, and thus apply for use also in the case of variable flow. E.g. phase lead and phase lag compensators can be presented by differential equations written in terms of z which, in addition to the input and output quantities additionally include derivatives of each with regard to z. With known methods of solving differential equations, these can be brought to a solved form which corresponds to the equation (7) without being, however, identical with it. The output quantity u(z) can be continuously determined from this equation, if the input quantity e(z) of the controller is known as a function of z. Likewise such known feedforward control algorithms (e.g. A. Niemi, Proc. of ISA Conf. (pp. 63-68) and Proc. of Joint Automatic Control Conf. (pp. 37-42), Philadelphia, Oct. 16-20, 1978, ISA, Pittsburgh), which are based on information of the model of the continuous flow process, can be determined with regard to z instead of t, when they take the variable flow into consideration.

If the process can be presented by first order differential equations, the controller can be designed in time domain by methods of optimal control. Especially for linear systems with constant coefficients and a quadratic control criterion, the textbooks present standard methods for determination of the controller, with the time variable t as the argument. These methods apply as such for use in the case of a variable flow as well, with z as the argument, for determination of the feedback control. Especially if the controller has to perform integrations or differentiations it is then beneficial to use a control method based on the variable z and perform these operations with regard to this variable instead of the time variable t. The presented control method eliminates the effects of changes of flow completely in principle, in control of concentration or of other quality characteristic of a material. If also other physical processes take place within the control object, in addition to the variation of the concentration effected by flow and mixing, the dynamical properties of the process often depend only partly on the flow. Such process and control function is e.g. the temperature of a continuous flow process and its control, while simultaneously heat losses to the environment take place. Also then the presented control method is beneficial, since while neglecting, in the same manner as the conventional controller, the effects of the changes of heat losses on the process dynamics, it anyway takes the effects of the variable flow into consideration, which the conventional controller neglects. With regard to the process dynamics, the effects of the flow are the more essential, the smaller the heat losses to the environment are. If the latter are negligible, the fully same advantages are reached with the presented control method, as in control of the concentration.

The presented method can be used beneficially also then, when some partial process is bound to the absolute time variable. This may be the case e.g. in control of concentration in such continuous flow reactor in which the progress of the reaction depends essentially on kinetic factors. In taking the effects of the flow changes into consideration the presented controller means also in this case a partial improvement with regard to the conventional controller.

The presented control method can be implemented in a straight-forward way by using as the controller a computer which may be e.g. a microcomputer. The computational operations required by the method are easy to program including the integration of the flow with regard to time and the integration and differentiation of the control deviation or of the other input quantities of the controller with regard to z. If the flow and the input quantities of the controller are expressed in analog signals, they have to be first brought into a digital form. Analog-to-digital converters are standard components aimed to this task, and likewise the transfer of digital data into a computer is a normal property of the real time computer. Likewise the conduction of the output signal of the controller into an actuator is a known operation and the digital-to-analog converter is a standard component which is used, when the control of the actuator requires an analog signal. Also other types of operations can be usefully executed in the controlling computer. Such an operation is the formation of the square root required in connection with the measurement of flow by means of an orifice element. Several components including the control unit may also be common to several control loops.

While using certain measurement devices for flow, e.g. those provided with a rotating mechanism, it may be beneficial to determine a signal which is proportional to the time integral of the flow or to the amount of material flowed through the process, at the measuring devices, separately from the controller itself. Then the determined quantity is transmitted continuously or repeatedly to the controller with which the above equipment for measurement and computation communicates and which operates in the manner presented earlier.

Mostly the space between the discrete signal elements or the sampling interval can be made considerably smaller than the dominating parameters of the process which usually requires that the z-interval is considerably smaller than 1. If this is not the case, it may be necessary to use special methods of the discrete control. They are analog to the corresponding methods of the continuous control, and the methods in question have been described in detail in textbooks on the basics of control engineering. The methods have been presented with the discretized time as the independent variable, but they are also applicable while using the above described variable which is directly proportional to the amount of material flowed through the continuous flow process, as the discretized, independent variable. The described method is thus applicable for use in the case of the discretized control in the same manner and with the same benefits as in the case of the continuous control.

The method can be alternatively implemented also with components handling analog signals. Then one must take into consideration that e.g. in electrical and pneumatic analog components the integration and differentiation take place with regard to the time variable and not with regard to z which would be required e.g. by the equation (7). By inspecting the meaning of the quantity z according to the equation (1), one sees that e.g. the derivative term present in the last member of the equation (7) can be compensated by the derivative of the control deviation with regard to time, if the member is additionally divided by the instantaneous value of the flow. Correspondingly the control deviation in the integrand of the next to the last member has to be multiplied by the instantaneous value of the flow after which the product in question is integrated with regard to time. The devices required for determination of the product of two variable quantities are known components in the technology of analog computers. The components required for integration, differentiation, addition, subtraction, and multiplication by constants are, on their part, already previously used in conventional analog controllers.

What is claimed is:

1. A method for the incorporation of varying flow in the control of specified process quantities, which method comprises the steps of:
   measuring the passing flow,
   integrating the result of the passing flow measurement to determine the amount of material flowed through the process,
   determining values of a variable in direct ratio to said amount of material, and
   performing the control of said specified process quantities synchronously with regard to said variable.

2. A method for the incorporation of varying flow in the control of predetermined process quantities, which method comprises the steps of:
   determining the difference between a prescribed desired value and the measured value of the output quantity of the process;
   computing the values of the output quantity of the process
   (a) by multiplying said difference by a constant,
   (b) by multiplying said difference by the instantaneous values of the passing flow, by integrating the product with regard to time and by multiplying the result of the integration by a second constant,
   (c) by differentiating said difference with regard to time to obtain a derivative, by dividing the derivative by the instantaneous value of the passing flow and multiplying the result by a third constant, and
   (d) by summing up the final results obtained in (a), (b), (c); and
   controlling said process quantities directly as a function of said computed values.

3. An apparatus for the incorporation of varying flow in the control of process quantities, which apparatus comprises:
   means for integrating, with regard to time, a signal which is directly proportional to the flow through the process, and
   control unit means for receiving input signals corresponding to said process quantities being controlled and for computing, on the basis of results of integration by said means for integrating and of prior and present values of said input signals, those values of output quantities which correspond to the present value of said results of integration, said control unit means including means for providing control signals corresponding to said values of output quantities.

4. An apparatus according to claim 3 comprising means for determining the difference of the prescribed desired value and of the measured value of the output quantity of the process the values of the output quantity of the control unit being computed by multiplying said difference by a constant and by integrating or by differentiating, or by integrating and by differentiating said difference with regard to said variable obtained as result of integration.

5. An apparatus according to claim 3 wherein said means for integrating is located separately from the control unit.

* * * * *